United States Patent [19]

Krause et al.

[11] Patent Number: 5,126,116

[45] Date of Patent: Jun. 30, 1992

[54] METHOD FOR FORMING COPPER ARSENATE

[75] Inventors: Eberhard Krause; Vladimir J. Zatka, both of Oakville; Steven W. Laundry, Burlington, all of Canada

[73] Assignee: Inco Limited, Toronto, Canada

[21] Appl. No.: 716,572

[22] Filed: Jun. 17, 1991

Related U.S. Application Data

[63] Continuation-in-part of Ser. No. 510,023, Apr. 16, 1990, abandoned.

[51] Int. Cl.⁵ .................. C01G 3/00; C01G 28/02
[52] U.S. Cl. ........................... 423/42; 423/27; 423/34; 423/47; 423/602; 423/604
[58] Field of Search .............. 423/602, 604, 27, 34, 423/87, 47, 42, 43; 424/622, 623

[56] References Cited

U.S. PATENT DOCUMENTS

| | | | |
|---|---|---|---|
| 3,868,439 | 2/1975 | Wadsworth | 423/27 |
| 4,959,203 | 9/1990 | Knoen et al. | 423/602 |
| 4,961,909 | 10/1990 | Boateng | 423/87 |
| 5,002,748 | 3/1991 | Jones et al. | 423/42 |
| 5,026,530 | 6/1991 | Drinkard, Jr. et al. | 423/87 |

Primary Examiner—John Niebling
Assistant Examiner—Brian M. Bolam
Attorney, Agent, or Firm—Francis J. Mulligan, Jr.; Blake T. Biederman

[57] ABSTRACT

The invention provides a method of forming copper arsenate. Copper and arsenic are leached into a treatment solution maintained at a pH level of about 2 to 5 in the presence of at least one impurity. An oxidant is added to the treatment solution to oxidize the copper and arsenic. A copper arsenate compound is precipitated from the solution as copper arsenate. Preferably, the copper arsenate is then releached in a purification solution. The molar ratio of copper to arsenic is adjusted to a level of at least 2. The pH of the purification solution is then increased to precipitate copper arsenate having a decreased concentration of said at least one impurity. Impure copper arsenate may be suspended and reacted in a recrystallization solution preferably having cupric ion. The pH of recrystallization solution is adjusted to a valve between about 1 and 4.5.

14 Claims, No Drawings

METHOD FOR FORMING COPPER ARSENATE

TECHNICAL FIELD

This application is a continuation-in-part of U.S. application Ser. No. 07/510,023, filed Apr. 16, 1990, now abandoned.

The instant invention relates to a method of forming copper arsenate, and more particularly, to a method of forming relatively pure copper arsenate from arsenic and copper containing mixtures, sludges, or other process intermediates.

BACKGROUND ART

Many of the ores mined to recover valuable metals such as nickel, cobalt, copper, uranium, gold, or others also contain arsenic in appreciable quantities. The processing of these arsenic containing ores has long been recognized as a problem in the mining industry. For example, much of the contained arsenic may volatilize during pyrometallurgical treatment, such as roasting, thus producing environmentally unacceptable arsenious oxide, $As_2O_3$. Alternatively, the arsenic may be dissolved during hydrometallurgical processing of the ores and must be removed from the resulting solution in order to produce the metal values of commercially acceptable purity. This arsenic removal can be accomplished by several different methods, including precipitation and solvent extraction. The resulting arsenic containing intermediates, e.g. precipitates, are enriched in arsenic and have to be appropriately treated to produce compounds that can be safely disposed of in existing disposal areas.

For example, common impurities dissolved in a nickel containing electrolyte include arsenic and copper. During purification of nickel containing electrolyte, $H_2S$ may be added to remove arsenic and copper from the electrolyte. The following reactions occur with the $H_2S$:

$$CuSO_4 + H_2S \rightleftharpoons CuS + H_2SO_4$$

$$2 H_3AsO_3 + 3 H_2S \rightleftharpoons As_2S_3 + 6 H_2O$$

Other metals contained in the electrolyte, may also precipitate during this operation, as does a small quantity of the nickel. The resulting arsenic and copper containing precipitate must be suitably treated to recover any of the valuable metal constituents. The contained arsenic will eventually have to be converted to a suitable product that can be utilized or disposed of in an environmentally acceptable manner. The production of stable arsenic compounds suitable for safe disposal can be very expensive.

Copper arsenate has long been used as an ingredient for preserving wood. Wood preservative compositions containing compounds of copper, chromium and of arsenic (CCA) are in widespread use. For example, the American Wood Preservers' Association gives three standard overall compositions:

| | TYPE A | TYPE B | TYPE C |
|---|---|---|---|
| Copper, expressed as wt. % CuO | 18.1 | 19.6 | 18.5 |
| Chromium, expressed as wt. % $CrO_3$ | 65.5 | 35.3 | 47.5 |
| Arsenic, expressed as wt. % | 16.4 | 45.1 | 34.0 |

| | TYPE A | TYPE B | TYPE C |
|---|---|---|---|
| $As_2O_5$ | | | |

Commonly, compounds used to prepare the final CCA compositions are copper arsenate and chromic acid. The copper arsenate used for the production of CCA compositions must be of high purity to ensure that no undesired reactions occur during the production of CCA compositions and that no undesired contaminants could leach out of the final wood treatment product.

W. K. Hartford in U.S. Pat. No. 4,103,000 discloses the production of slurries of copper arsenate by reacting copper metal with arsenic acid in the presence of an oxidizing agent, e.g., oxygen, and an acid catalyst such as nitric acid, sulfuric acid, or hydrochloric acid. European Patent Application 244,682 disclosed production of copper arsenate by reaction of copper metal with arsenic acid and hydrogen peroxide, e.g.:

$$3 Cu + 2 H_3AsO_4 + 3 H_2O_2 \rightarrow Cu_3(AsO_4)_2 + 6 H_2O$$

U. Dienstbach in U.S. Pat. No. 4,405,569 teaches the formation of soluble sodium arsenate during oxidative leaching of a cobalt and nickel containing concentrate with sodium hydroxide at elevated temperatures and pressures. Following removal of the insoluble metal hydroxides by filtration, the sodium arsenate solution can be reacted with copper sulfate solution to precipitate crystalline copper arsenate:

$$3 CuSO_4 + 2 Na_3AsO_4 \rightarrow Cu_3(AsO_4)_2 + 3 Na_2SO_4$$

According to Magalhaes et al., in "The chemistry of formation of some secondary arsenate materials of Cu (II), Zn (II) and Pb (II)," published in Mineralogical Magazine, December 1988, Vol. 52, pp. 679-90, several copper arsenate minerals are found in nature, such as lammerite, $Cu_3(AsO_4)_2$; olivenite, $Cu_2AsO_4(OH)$; and clinoclase, $Cu_3AsO_4(OH)_3$. Other copper arsenates include $CuHAsO_4 \cdot H_2O$ which is used for wood preservative compositions. Different copper arsenates can be formed depending on the conditions prevailing during their precipitation, e.g. solution composition, pH, and temperature. For example, Mirza et al. showed that crystalline basic copper arsenate, $Cu_2AsO_4(OH)$, can be precipitated at a pH of about 4 and a temperature of about 90° C.

$$2 CuSO_4 + H_3AsO_4 + H_2O \rightleftharpoons Cu_2AsO_4(OH) + 2 H_2SO_4$$

Takahashi et al. in U.S. Pat. No. 4,357,261 disclose a method for copper arsenate production from a copper, arsenic, and sulfide containing refinery by-product. However, the invention teaches that copper and arsenic are extracted into solution during leaching under acidic conditions. Copper hydroxide containing copper arsenate is then precipitated from the leach solution by addition of sodium hydroxide solution to a pH of 6–7. As reported by T. Terayama in "ARSENIC RECOVERY AND HIGH PURITY ARSENIC METAL PRODUCTION FROM ARSENIC RESIDUES OF COPPER SMELTING PROCESS," published in Metallurgical Review of MMIJ, Vol. 6, No. 2, 1989, the Sumitomo Metal Mining Co. Ltd. actually practices a slightly modified process for the production of copper arsenate. Copper and arsenic containing solution obtained after caustic leaching of decopperized copper electrorefining slimes is combined with an arsenic sulfide intermediate. Copper arsenate of the approximate composition $Cu_3(AsO_4)_2$ is then precipitated following further neutralization with sodium hydroxide. The resulting product has a high moisture content of about 50% or more.

It is desirable to produce a crystalline copper arsenate product having improved handling properties and a low moisture content. Copper arsenate having a low moisture content has a reduced drying requirement and may have reduced transportation costs through weight saving.

It is an object of the present invention to provide a low cost method for producing high purity crystalline, basic copper arsenate, $Cu_2AsO_4(OH)$.

It is a further object of the invention to produce a basic copper arsenate of low moisture content for use in the wood preservation industry from impure process intermediates and/or by-products such as arsenic sulfide containing sludges.

It is a further object of the invention to provide an economical method for the conversion of impure amorphous copper arsenates of high moisture contents to crystalline, basic copper arsenate, $Cu_2AsO_4(OH)$, with low moisture content and improved handling characteristics.

SUMMARY OF THE INVENTION

The invention provides an economical method of forming crystalline copper arsenate of high purity suitable for use in the wood preservation industry from copper and arsenic containing process intermediates, sludges, and the like. Green copper arsenate having the molecular formula $Cu_2AsO_4(OH)$ is preferably produced by the invention. Association of cupric ion in aqueous solution with oxidiferous pentavalent arsenic in a mole ratio of copper to arsenic of at least about 2 at a temperature in excess of about 50° C. is used to form $Cu_2AsO_4(OH)$ in the presence of the aqueous media.

A copper and arsenic containing solid feed is leached in a treatment solution using a source of acid. An oxidant is simultaneously added to oxidize copper and arsenic. The addition of acid is done such that the pH during leaching is maintained in the range of about pH 2 to 5, preferably 2.5 to 4.5. Leaching can be carried out in the presence of high concentrations of other metals, such as nickel and cobalt, that do not precipitate as arsenate in that pH range. An impure copper arsenate precipitate is formed during leaching.

Following filtration, the solids are preferably releached in a purification solution. The pH of the releach solution is preferably about 2 or lower. After possible addition of soluble copper to the resulting solution to obtain a molar Cu/As ratio of at least about 2, the pure basic copper arsenate, $Cu_2AsO_4(OH)$, is precipitated by addition of a suitable base such as an alkali metal hydroxide or carbonate.

Impure copper arsenate precipitates that do not meet the purity criteria set by the wood preservative industry are then suspended in a recrystallization solution. The pH of the recrystallization solution is maintained at a value between about 1 and 4.5 and preferably between about 2.5 and 4.0. The impure copper arsenate is reacted with cupric ion and, optionally, with base to produce a crystalline copper arsenate of low moisture content and improved purity.

DESCRIPTION OF PREFERRED EMBODIMENT

The process of the invention provides a means for producing copper arsenate from process intermediates such as copper and arsenic containing sludges. In fact, the method of the invention during experimental tests has successfully produced commercially pure copper arsenate from impure solutions.

Copper and arsenic containing intermediates include those residues remaining after electrorefining of copper, as well as precipitates of copper and arsenic sulfides. These refinery intermediates commonly contain large quantities of entrained liquor, e.g. copper or nickel electrolyte. Additional impurities typically include, cobalt, iron, lead, calcium, sodium, chlorine and sulfur. Chlorine is typically present as aqueous chloride ions and sulfur may be present as a sulfide or sulfate. It is an important feature of the present invention that the removal of this entrained liquor from the copper and arsenic containing solids is generally not required. This eliminates the costs for a solid/liquid separation step and simplifies processing of these intermediates. In fact, as known in the art, some of the dissolved chemical species present in the electrolyte, e.g. chloride ion, may actually speed the rate of leaching and/or oxidation.

Step 1 is a leaching step where copper and arsenic containing species are simultaneously dissolved, oxidized, and reprecipitated to form an impure ("crude") copper arsenate. This step is carried out in the pH range 2 to 5, preferably 2.5 to 4.5. Step 2 is a redissolution and precipitation step. In this operation the impure copper arsenate is dissolved in dilute acid to separate it from any acid insoluble components of the leach residue, such as elemental sulfur, lead sulfate, and the like. Then a suitable base and possibly additional soluble copper is supplied to precipitate olive-green copper arsenate, $Cu_2AsO_4(OH)$, from the redissolution liquor. The above copper arsenate is commonly of sufficient purity. However, a second purification step (Step 3) may be required on occasion to attain the desired purity.

STEP 1: LEACHING

A copper and arsenic containing solid feed, suspended either in the corresponding electrolyte solution or in water, is leached in the presence of an oxidizing reagent, such as air, oxygen or hydrogen peroxide. The pH during leaching is controlled in the range of 2 to 5, preferably 2.5 to 4.5, by addition of an acid such as sulfuric acid. When leaching is conducted at a sufficiently high pH, no external acid addition may be required if the sludge contains acid forming constituents such as copper and arsenic sulfides. Different copper arsenate compounds can form in the above pH range. Copper arsenate precipitates range from blue in color to green in color and may contain combinations thereof. As will be demonstrated in the examples, the extent of copper arsenate precipitation during the leaching step and the compositions of the precipitated copper arsenates depend on the leaching conditions and on the impurities present during the leaching step. Precipitation pH and temperature are important factors that control the ultimate composition of the copper arsenate precipitate.

The following equations are used to illustrate the many different reactions that may occur during the leaching step when a copper and arsenic containing sulfide precipitate is subjected to leaching in aqueous solution with oxygen sparging. The first three reactions demonstrate how metals are released into aqueous solution from their respective sulfides. The sulfidic sulfur can either be oxidized to elemental sulfur or to sulfate. The formation of sulfate is favoured when leaching is carried out at higher pH levels. It is important to reiterate that all of the following reactions typically occur simultaneously during the leaching step.

$$CuS + 2 H^+ + 0.5 O_2 \rightarrow Cu^{2+} + S + H_2O$$

$$As_2S_3 + 3 H_2O + 1.5 O_2 \rightarrow 2 H_2AsO_3^- + 3 S + 2 H^+$$

$$CuS + 2 O_2 \rightarrow Cu^{2+} + SO_4^{2-}$$

Oxidation of the arsenic to the pentavalent state is essential before copper arsenate can precipitate.

$$H_2AsO_3^- + 0.5 O_2 \rightarrow H_2AsO_4^-$$

$$2 H_2AsO_4^- + 3 Cu^{2+} \rightleftharpoons Cu_3(AsO_4)_2 + 4 H^+$$

$$4 H_2AsO_4^- + 5 Cu^{2+} + Ca^{2+} + Na^+ + Cl^- \rightleftharpoons NaCaCu_5(AsO_4)_4Cl + 8 H^+$$

$$H_2AsO_4^- + 2 Cu^{2+} + H_2O \rightleftharpoons Cu_2AsO_4(OH) + 3 H^+$$

The $Cu_3(AsO_4)_2$ and the $NaCaCu_5(AsO_4)_4Cl$ solids are of blue color, whereas $Cu_2AsO_4(OH)$ is olive-green. The blue colored copper arsenates are generally less pure and amorphous. Optionally, the molar ratio of copper to arsenic may be adjusted to control the nature of the copper arsenate precipitated.

It is principally advantageous to conduct the leaching step at a high enough temperature and oxidant concentration to promote fast leaching. This suggests that leaching at elevated temperatures and pressures is preferred. However, the solubility of copper arsenates generally increases with increasing temperature. The composition of the leach feeds may ultimately determine the optimum operating temperature. For the above example of a copper and arsenic containing sulfide precipitate, the optimum range of leach temperatures is between about 50° C. and boiling and preferably between about 70° C. and 95° C.

Upon completion of the leaching step, copper arsenate containing solids are suitably separated from the leach solution, e.g. by filtration or centrifuging. The solids may have to be washed to remove the entrained liquor prior to the redissolution and precipitation step. The leach solution and any wash liquor is processed by conventional means to recover any of the contained metal constituents therein.

STEP 2: REDISSOLUTION AND PRECIPITATION

The leach residue contains the impure copper arsenate precipitate as well as other insoluble products of leaching, such as elemental sulfur or lead sulfate. Although it is recognized that separation of the elemental sulfur from copper arsenate is possible using physical separation techniques such as flotation, the preferred route of processing the leach residue is to releach the impure copper arsenate in a purification solution. The purification solution contains dilute acid, such as sulfuric acid, at a pH of less then 2, preferably at a pH of about 1. The temperature of the redissolution step is not very important. It may vary from ambient to about 80° C.

Following the redissolution step, the copper and arsenic containing solution is suitably separated from the remaining leach residue. e.g. by filtration or centrifuging. The leach residue may be washed. The wash liquors are combined with the solution and used as feed for the precipitation step.

In order to precipitate crystalline green copper arsenate of the composition $Cu_2AsO_4(OH)$ from the redissolution liquor, the molar copper to arsenic ratio should be adjusted to about two or greater. Incomplete arsenic precipitation results when the molar Cu/As ratio is below two. Additional soluble divalent copper can, for example, be supplied as copper sulfate or copper chloride solution to the redissolution liquor prior to precipitation.

The pure copper arsenate is precipitated by adding a suitable base, such as an alkali metal hydroxide or a carbonate solution to the redissolution liquor. The final pH during precipitation should be between about 2.5 and 4.5, preferably about 3.5. The optimum temperature for this operation is 80° C. to boiling. The physical properties of the resulting copper arsenate precipitate, e.g. settling rate, filtration rate, and precipitate moisture, all improve with increasing precipitation temperature.

Following separation of the copper arsenate from solution by filtration or centrifuging and sufficient washing, the resulting copper arsenate product preferably consists essentially of $Cu_2AsO_4(OH)$. The copper arsenate is commonly of sufficient purity to be suitable as a feedstock for the wood preservative industry. If, however, the purity specifications are not met, the copper arsenate precipitate can be subjected to the following optional purification step.

STEP 3: COPPER ARSENATE PURIFICATION

If the copper arsenate precipitate requires further purification, one of several methods may be suitable, depending on the nature of the impurity that has to be removed. What we have found is that even the least pure copper arsenate precipitate, e.g. amorphous blue copper arsenate of the approximate composition $NaCaCu_5(AsO_4)_4Cl$ can be converted to crystalline green copper arsenate, $Cu_2AsO_4(OH)$, by reacting aqueous slurries thereof with additional soluble copper in a recrystallization solution, e.g.:

$$NaCaCu_5(AsO_4)_4Cl + 3 Cu^{2+} + 4H_2O \rightarrow 4Cu_2AsO_4(OH) + Na^+ + Ca^{2+} + Cl^- + 4H^+$$

First, impure copper arsenate is suspended in a recrystallization solution containing a soluble copper salt. Copper sulfate, cupric chloride, and other soluble salts are potentially suitable for this purpose. The preferred temperature for this operation is 80° C. to boiling. Finally, the pH of the recrystallization solution is adjusted with a base addition, e.g. sodium hydroxide or sodium carbonate, to a pH of about 1 to 4.5, preferably about 2.5 to 4.0. The impure copper arsenate reacts with the recrystallization solution to attain nearly quantitative precipitation of the olive-green copper arsenate [$Cu_2AsO_4(OH)$].

The present invention will now be described below with reference to working examples. Examples 1 and 2 demonstrate only the leaching operation, Example 3 and 4 describe both the leaching and redissolution steps. The pure copper arsenate precipitation is illustrated in Examples 5 to 7. Examples 8 and 9 describe the optional purification process. Finally, Example 10 illustrates leaching at lower pH values and the precipitation and use of basic copper chloride for adjusting the molar Cu/As ratio prior to the precipitation of Cu$_2$AsO$_4$(OH), olivenite. Preferably, the steps are carried out in the order leaching, redissolution, precipitation and purification. The copper arsenate formed after the leaching operation may be a sufficiently pure crystalline Cu$_2$AsO$_4$(OH) for commercial use.

EXAMPLE 1

A copper and arsenic sulfide containing precipitate, suspended in an aqueous nickel electrolyte in the form of a thickener underflow, was continuously leached by simultaneous addition of concentrated sulfuric acid and oxygen. The feed solids content was 109 g/L. The feed solids analyzed (%) 49.6 Cu, and 4.64 As. The nickel electrolyte analyzed (g/L) 0.001 Cu, 71.9 Ni, 1.71 As, about 120 SO$_4$, and about 50 Cl prior to leaching. Leaching was conducted at 80° C. in a mechanically stirred tank of 6 L operating volume. The thickener underflow was continuously pumped into the leach tank at a flow rate giving an average slurry retention time of 3 hours during leaching. The addition of sulfuric acid was controlled to hold the pH in the leach tank constant at 1.5. Commercially pure oxygen was sparged into the tank at a flow rate of about 0.2 L/min per L of slurry. The oxygen was introduced just below the bottom impeller in order to form small oxygen bubbles.

After operating the leach circuit for a sufficiently long time to attain steady-state conditions, the leach tank contents were sampled and filtered. The redox potential was +418 mV measured against the standard calomel electrode. The leach residue was washed with distilled water and dried. The leach solution analyzed (g/L) 47.1 Cu and 5.18 As. The leach residue contained mainly elemental sulfur and analyzed (%) 7.09 Cu, 1.44 As, and 79.4 S. The proportions of Cu and As reporting to the solution were 95.9% and 92.7% respectively. The above example illustrates how both Cu and As are dissolved during leaching at pH 1.5.

EXAMPLE 2

The same feed slurry as described in Example 1 was reacted with sulfuric acid and oxygen under identical conditions as in Example 1, except for the pH. In Example 2, the sulfuric acid was added to control the pH at 2.0. The redox potential was +416 mV measured against the standard calomel electrode. The resulting leach solution analyzed (g/L) 44.8 Cu and 2.10 As. The leach residue assay was (%) 16.3 Cu, 10.5 As, and 54.5 S. The leach residue contained mainly elemental sulfur and a blue copper arsenate. The proportions of Cu and As reporting to the solution were reduced to 86.2% and 31.5% respectively. Example 2 illustrates that copper arsenate was produced during leaching at pH 2.0.

EXAMPLE 3

Continuous leaching of another sample of a copper and arsenic sulfide containing precipitate, suspended in a nickel electrolyte in the form of a thickener underflow, was carried out in two tanks of 1.0 L operating volume connected in series. The feed solids analyzed (%) 41.6 Cu, 12.0 As, 7.22 Ni, and 35.3 S. The solids content was 89 g/L; the nickel electrolyte analyzed (g/L) 0.008 Cu, 55.9 Ni, 0.87 As, 78.1 SO$_4$, and 31.9 Cl. The feed slurry was continuously pumped into the first tank where the pH was controlled at 2.5 by addition of concentrated sulfuric acid. Oxygen was sparged into both leaching tanks at a flow rate of 0.23 L/min per L of slurry. The leach temperature was 60° C. in both tanks. The average retention time was 5 h per tank. Leached slurry overflowed from the second leach tank and was collected. No acid was added to the second leach tank.

After operating the leach circuit for a sufficiently long time to attain steady-state conditions, the #2 leach tank overflow had a pH of 3.2 and a redox potential of +390 mV, as measured against the standard calomel electrode. The tank #2 slurry was sampled and filtered. The leach solution analyzed (g/L) 21.8 Cu, 62.9 Ni, 0.60 As, 121 SO$_4$, and 32.0 Cl. The water-washed leach residue, consisting mainly of elemental sulfur and a blue copper arsenate, was subjected to releaching for 10 min. at 23° C. in dilute sulfuric acid at a pH of 1.2. The resulting releach liquor analyzed (g/L) 51.6 Cu, 0.69 Ni, 42.4 As, and 7.8 Cl. The recovery of arsenic to the releach liquor was 96.2%. About 40% of the copper reported to the releach liquor. Based on the analysis of the releach liquor, the molar Cu/As ratio of the copper arsenate produced during leaching was 1.43.

EXAMPLE 4

Continuous leaching of yet another sample of a copper and arsenic sulfide containing precipitate, suspended in a nickel electrolyte in the form of a thickener underflow, was carried out in two tanks of 6.0 L operating volume connected in series. The feed solids analyzed (%) 41.9 Cu, 13.0 As, 6.33 Ni, and 33.0 S. The solids content was 40 g/L; the nickel electrolyte analyzed (g/L) less than 0.01 Cu, 73.2 Ni, 0.087 As, 108.5 SO$_4$, and 55.5 Cl. The feed slurry was continuously pumped into the first leach tank. Oxygen was sparged into both leaching tanks at a flow rate of 0.41 L/min per L of slurry. There was no acid addition to either tank #1 or #2. The leach temperature was 95° C. in both tanks. The pH in tank #1 was found to be 4.2 under steady-state conditions, the pH in tank #2 was 3.9.

After operating the leach circuit for a sufficiently long time to attain steady-state conditions, the redox potential in tank #2 was +363 mV, as measured against the standard calomel electrode. The tank #2 slurry was sampled and filtered. The leach solution analyzed (g/L) 3.7 Cu, 86.7 Ni, 0.33 As, and 133 SO$_4$. The water-washed leach residue, containing only small quantities of elemental sulfur, was subjected to releaching for 5 min. at 23° C. in dilute sulfuric acid at a pH of 1.0. The resulting releach liquor analyzed (g/L) 20.6 Cu, 4.15 Ni, 8.76 As, and 7.8 Cl. The recovery of arsenic to the releach liquor was 92.8%. About 76% of the copper reported to the releach liquor. Based on the analysis of the releach liquor, the molar Cu/As ratio of the copper arsenate produced during leaching was 2.77. Example 4 illustrates that leaching at higher pH values results in the precipitation of more nickel and copper.

EXAMPLE 5

A releach liquor, obtained from pH 1 releaching of several samples of high pH leach residues, analyzed (g/L) 63.4 Cu, 31.6 As, 7.52 Ni, 4.20 Na, and 15.4 Cl. This liquor was continuously fed into the first of two precipitation tanks connected in series. Each of the tanks had an operating volume of about 0.5 L. Sodium carbonate solution of 200 g/L strength was added to the first tank to control a pH of 3.5 for the precipitation of copper arsenate. The pH was 3.3 in the second precipitation tank. The temperature in both precipitation tanks was 95° C. The average retention time in each tank was about one hour.

After steady-state conditions were attained, the product slurry was filtered, and the olive-green copper arsenate precipitate was washed with distilled water. The barren solution analyzed (g/L) 7.93 Cu, 0.38 As, 5.55 Ni, 32.2 Na, and 12.2 Cl. The degree of arsenic precipitation was 98.0%. The copper arsenate product analyzed (%) 43.4 Cu, 24.1 As, 0.35 Ni, 0.12 Na, and 0.10 Cl. The X-ray diffraction analysis found the product solids to be composed of olivenite, $Cu_2AsO_4(OH)$.

EXAMPLE 6

Another releach liquor, obtained from pH 1 releaching of pH 2.5-3.5 leach residues, was spiked with copper sulfate to produce a feed liquor for copper arsenate precipitation, analyzing (g/L) 46.8 Cu, 28.1 As, 0.75 Ni, 0.87 Ca, and 4.46 Cl. This liquor was continuously pumped into the first precipitation tank of the same experimental setup described in Example 5. The temperature was 100° C. in both precipitation tanks. Sodium hydroxide solution of 153 g/L strength was added to tank #1 to control the pH at 3.5. The pH in the second tank was 3.65. The average retention time was about one hour per tank.

After steady-state conditions were attained, the product slurry was filtered, and the olive-green copper arsenate precipitate was washed with distilled water. The barren solution analyzed (g/L) 1.31 Cu, 1.16 As, 0.52 Ni, 0.57 Ca, 26.6 Na, and 3.65 Cl. The degree of arsenic precipitation was 82.7%. The copper arsenate product analyzed (%) 45.1 Cu, 26.0 As, 0.11 Ni, 0.13 Ca, 0.06 Na, and 0.03 Cl. The X-ray diffraction analysis found the product solids to be composed of olivenite, $Cu_2AsO_4(OH)$. The moisture content of the copper arsenate was about 20%.

EXAMPLE 7

An additional releach liquor was obtained from pH 1 releaching of pH 2.5-3.5 leach residues. The releach liquor was spiked with copper sulfate to produce a feed liquor for copper arsenate precipitation, analyzing (g/L) 55.2 Cu, 22.4 As, and 1.40 Ni. This liquor was continuously pumped into the first precipitation tank of the same experimental setup described in Example 5. However, the temperature was only 80° C. in both precipitation tanks. Sodium hydroxide solution of 153 g/L strength was added to tank #1 to control the pH at 3.5. The pH in the second tank was 3.1. The average retention time was about one hour per tank.

After steady-state conditions were attained, the product slurry was filtered. The precipitate was of blue-green color and had a high moisture content (about 60%). The barren solution analyzed (g/L) 12.7 Cu, 0.28 As, and 1.13 Ni. The degree of arsenic precipitation was 98.5%. The washed copper arsenate product analyzed (%) 39.3 Cu, 22.4 As, less than 0.05 Ni, 1.25 Na, and 1.11 Cl. Example 7 illustrates that a precipitation temperature of 80° C. is not sufficient to produce copper arsenate of sufficiently high purity and with low moisture content.

EXAMPLE 8

One hundred grams of a moist (47% water) impure blue copper arsenate precipitate, analyzing (%, dry basis) 31.3 Cu, 28.0 As, 4.58 Na, 3.15 Cl, 0.06 Ni, and 1.28 Ca, were subjected to batchwise reaction with 0.5 L of a copper sulfate solution at 95° C. The starting copper concentration was 22 g/L, corresponding to a soluble copper addition of 110% of that stoichiometrically required to raise the molar Cu/As ratio for the copper arsenate from 1.32 to 2.0. Within 50 minutes of contact, the color of the copper arsenate solids had changed from blue to olive-green and the pH dropped from 2.4 to 0.7. The slurry was sampled at this point and filtered. The solution analyzed (g/L) 16.4 Cu, 7.47 As, and 1.22 Ca. The washed solids analyzed (%) 43.5 Cu, 25.9 As, 0.13 Na, 0.18 Cl, and 0.36 Ca.

The experiment was continued for a total of 110 min. to precipitate a greater portion of the copper and arsenic by slowly adding sodium hydroxide solution (10% strength) to the slurry until a pH of 3.43 was reached. The final slurry was then filtered. The barren solution analyzed (g/L) 1.65 Cu, less than 0.005 As, and 0.71 Ca. The washed solids were of olive-green color and analyzed (%) 44.0 Cu, 25.4 As, 0.02 Na, 0.02 Cl, less than 0.05 Ni, and 0.35 Ca. The copper arsenate product had a moisture content of about 25%.

The above example illustrates how even a very impure blue copper arsenate with a relatively high moisture content can be converted to the pure olive-green copper arsenate, $Cu_2AsO_4(OH)$, with a low moisture content.

EXAMPLE 9

About 950 g of a copper arsenate precipitate analyzing (%) 41.5 Cu, 23.5 As, 0.29 Ni, 0.40 Na, 3.07 Cl, and 0.51 Ca were suspended in about 3.5 L of solution analyzing (g/L) 1.3 Cu, 0.01 As, 0.94 Ni, 5.4 Na, and 1.9 Cl and spiked with 134 g of $CuCl_2.H_2O$. The slurry was heated to 95° C. After a total of 5 hours at temperature the slurry was filtered. The resulting washed copper arsenate solids analyzed (%) 43.4 Cu, 24.5 As, 0.16 Ni, 0.04 Na, 0.03 Cl, and 0.32 Ca.

EXAMPLE 10

Step 1: Copper and arsenic sulfide containing feed solids analyzing (%) 38.9 Cu, 5.31 As, and 13.2 Ni suspended in Ni and As containing electrolyte (86 g solids/L) were leached with oxygen in the experimental setup described in Example 1. The temperature was held at 80° C. Sulfuric acid was added to control pH in leach tanks #1 and #2 at 2.5 and 3.0, respectively. The leach residue consisted mainly of blue copper arsenate, $NaCaCu_5(AsO_4)_4Cl$, and elemental sulfur. The leach solution analyzed (g/L) 27.7 Cu, 88.6 Ni, and 0.25 As. The leach residue contained 94.7% of the total feed As and 20.2% of the feed Cu.

Step 1A: The above leach solution was treated at 60°-95° C. with $Na_2CO_3$ solution in predetermined quantities to precipitate basic copper chloride of the approximate composition $CuCl_2-3 Cu(OH)_2$. The precipitation of copper (up to 85% of Cu present) and nickel increases with increasing $Na_2CO_3$ additions. A typical precipitate analyzed (%) 49.5 Cu, 3.4 Ni, and 0.45 As, and about 14% Cl.

Step 2: The leach residue from step 1 was releached with sulfuric acid to a pH of 0.8. Basic copper chloride from step 1A was added to the releach liquor in the required amount to increase the molar Cu/As ratio to about 2.0. The pH rose to 1.3 following the addition of basic copper chloride, which dissolved without precipitate formation. The resulting solution, analyzing (g/L) 46.1 Cu, 2.60 Ni, 24.9 As, 5.20 Na, and 8.69 Cl, was fed to a copper arsenate precipitation circuit similar to that described in Example 5. The precipitation temperature was 95° C. and the pH in tank #1 was controlled at 3.5 by addition of Na$_2$CO$_3$ solution (200 g/L). The resulting olivenite precipitate had a moisture content of 12.9% and analyzed (%) 44.0 Cu, 24.2 As, and 0.23 Ni.

The above example demonstrates the leaching of a copper and arsenic containing feed under conditions to form blue copper arsenate with a molar Cu/As ratio of 1.25. The example also teaches a cost effective method of providing the Cu reagent to raise the Cu/As ratio to about 2.0 prior to precipitating a high-purity basic copper arsenate of low moisture.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. A process for producing crystalline green copper arsenate essentially having a molecular formula of Cu$_2$AsO$_4$(OH) comprising association of cupric ion in aqueous solution with oxidiferous pentavalent arsenic in a mole ratio of copper to arsenic of at least about 2 and causing said cupric ion and said oxidiferous pentavalent arsenic to associate as Cu$_2$AsO$_4$(OH) in the presence of the aqueous media of said solution at a temperature in excess of about 50° C.

2. The process of claim 1 wherein said copper and said oxidiferous pentavalent arsenic are both present from solid feed dissolved in said aqueous solution.

3. The process of claim 2 wherein said solid feed contains sulfur-containing compounds.

4. The process of claim 1 wherein said oxidiferous pentavalent arsenic is present as a copper arsenate solid, other than Cu$_2$AsO$_4$(OH), dispersed in said aqueous solution containing cupric ion.

5. A method of forming copper arsenate comprising:
a) providing an aqueous treatment solution and a solid feed containing copper and arsenic and maintaining pH of said treatment solution at a level of about 2 to 5 and temperature of said treatment solution between about 50° C. and boiling;
b) leaching copper and arsenic into said treatment solution in the presence of at least one impurity in said treatment solution and adding an oxidant to said treatment solution to oxidize said solid feed containing copper and arsenic;
c) precipitating solid copper arsenate compound in said treatment solution to leave at least a portion of said at least one impurity in said treatment solution and separating said solid copper arsenate from said treatment solution;
d) releaching said separated copper arsenate in a purification solution to dissolve copper and arsenate into said purification solution;
e) adjusting said dissolved copper and arsenate solution to maintain the molar ratio of copper to arsenic at a level of about 2 or greater; and
f) increasing pH of said purification solution and maintaining temperature of said purification solution between about 80° C. and boiling to precipitate Cu$_2$AsO$_4$(OH) containing a decreased concentration of impurities.

6. The method of claim 5 wherein said pH of said purification solution is about 2 or lower and said temperature of said purification solution is between about 90° C. and boiling.

7. The method of claim 5 wherein said pH of said purification solution is increased to a pH level between about 2.5 and 4.0.

8. The method of claim 5 wherein concentration of sodium and chloride in said copper arsenate are reduced.

9. The method of claim 5 wherein said pH of said purification solution is increased with a base selected from the group consisting of alkali metal hydroxides and carbonates.

10. The method of claim 5 wherein said pH of said treatment is maintained between 2 and 3 to precipitate a solid copper arsenate compound having a molar ratio of about 1.25.

11. The method of claim 10 wherein copper chloride is precipitated from said treatment solution to provide copper for said adjusting of said molar ratio of copper to arsenate.

12. A method of forming copper arsenate comprising:
a) providing an aqueous treatment solution and a solid feed containing copper and arsenic and maintaining pH of said treatment solution at a level of about 2 to 5 and temperature of said treatment solution between about 50° C. and boiling;
b) leaching copper and arsenic into said treatment solution in the presence of at least one impurity in said treatment solution and adding an oxidant to said treatment solution to oxidize said solid feed containing copper and arsenic;
c) precipitating solid copper arsenate compound in said treatment solution to leave at least a portion of said at least one impurity in said treatment solution and separating said solid copper arsenate from said treatment solution;
d) suspending said separated copper arsenate in a recrystallization solution containing a soluble copper salt;
e) reacting said separated copper arsenate with said recrystallization solution to form Cu$_2$AsO$_4$(OH); and
f) adjusting pH of said recrystallization solution to a value of about 1 to 4.5.

13. The method of claim 12 wherein the pH of said recrystallization solution is adjusted to about 2.5 to 4.0.

14. The method of claim 12 wherein a base is added to said recrystallization solution for said adjusting of said pH.

* * * * *